United States Patent [19]
Planche et al.

[11] Patent Number: 5,874,492
[45] Date of Patent: *Feb. 23, 1999

[54] PROCESS FOR THE PREPARATION OF BITUMEN-POLYMER COMPOSITIONS, APPLICATION OF THE COMPOSITIONS OBTAINED TO THE PRODUCTION OF COATINGS AND POLYMER MASTER SOLUTION FOR OBTAINING THE SAID COMPOSITIONS

[75] Inventors: Jean-Pascal Planche, Lyons; Laurent Germanaud, Heyrieux; Pascal Nicol, Pau; François Travers, La Talaudiere, all of France

[73] Assignee: Koch Material Company, Wichita, Kans.

[*] Notice: The term of this patent shall not extend beyond the expiration date of Pat. No. 5,605,946.

[21] Appl. No.: 804,319

[22] Filed: Feb. 21, 1997

Related U.S. Application Data

[62] Division of Ser. No. 553,820, Nov. 6, 1995, Pat. No. 5,605,946, which is a continuation of Ser. No. 140,101, Nov. 2, 1993, abandoned.

[30] Foreign Application Priority Data

| Mar. 3, 1992 | [FR] | France | .................................... 9202506 |
| Mar. 1, 1993 | [FR] | France | .................................... 93/00203 |

[51] Int. Cl.$^6$ .................................................. C08L 95/00
[52] U.S. Cl. ................ 524/68; 524/59; 524/62; 524/476; 524/481; 524/486; 524/484; 525/54.5; 523/351
[58] Field of Search .................. 524/59, 62, 68, 524/476, 481, 486, 484; 525/54.5; 533/351

[56] References Cited

U.S. PATENT DOCUMENTS

| 4,145,322 | 3/1979 | Maldonado et al. ...................... 524/68 |
| 4,330,449 | 5/1982 | Maldonado et al. ...................... 524/68 |
| 4,554,313 | 11/1985 | Hagenbach et al. ...................... 524/68 |
| 4,567,222 | 1/1986 | Hagenbach et al. ...................... 524/476 |
| 4,585,816 | 4/1986 | Vitkuske et al. .......................... 524/68 |
| 5,100,938 | 3/1992 | Vitkuske et al. .......................... 524/68 |
| 5,100,939 | 3/1992 | Vikuske et al. ............................ 524/68 |
| 5,120,777 | 6/1992 | Chaverot et al. .......................... 524/68 |
| 5,314,935 | 5/1994 | Chaverot et al. .......................... 524/68 |
| 5,371,121 | 12/1994 | Bellomy et al. .......................... 524/68 |
| 5,605,946 | 2/1997 | Planche et al. ............................ 524/68 |

FOREIGN PATENT DOCUMENTS

| 20203 | 12/1980 | European Pat. Off. ................. 524/62 |
| 174795 | 3/1986 | European Pat. Off. ................. 524/68 |

*Primary Examiner*—Peter A. Szekely
*Attorney, Agent, or Firm*—Burgess, Ryan & Wayne

[57] ABSTRACT

A process is provided for the preparation of a bitumen-polymer composition which comprises (a) producing at a temperature of between 100° C. and 230° C., a mixture of
   (i) a bitumen
   (ii) a linear block copolymer of styrene and a conjugated diene, the block copolymer being used in a quantity of from 0.5% to 25% by weight of bitumen and having a weight-average molecular weight of between 170,000 and 250,000 and a structure of A-B-A with A denoting a polymer block consisting of a polystyrene block which may be extended on the B side by a random copolymer of styrene and of the conjugated diene and B denoting a polymer block consisting of conjugated diene units, and
   (iii) a coupling agent containing at least one sulphur-donor compound and used in an amount to provide a quantity of sulphur representing, by weight, 0.1% to 10% of the weight of the linear block copolymer of styrene and conjugated diene; and
(b) keeping the mixture thus produced at a temperature of between 100° C. and 230° C. and with stirring, for a period of at least ten minutes.

31 Claims, No Drawings

PROCESS FOR THE PREPARATION OF BITUMEN-POLYMER COMPOSITIONS, APPLICATION OF THE COMPOSITIONS OBTAINED TO THE PRODUCTION OF COATINGS AND POLYMER MASTER SOLUTION FOR OBTAINING THE SAID COMPOSITIONS

This is a division of application Ser. No.: 08/553,820 filed on Nov. 06, 1995, now U.S. Pat. No. 5,605,946 which is a continuation of Ser. No. 08/140,101 filed on Nov. 02, 1993, abandoned.

BACKGROUND OF THE INVENTION

1) Field of the Invention

The invention relates to a process for the preparation of bitumen-polymer compositions. It further relates to the application of the compositions obtained to the production of coatings and in particular of road surface dressings, of bituminous mixtures or of seal coatings, and also relates to a polymer master solution usable for obtaining the said compositions.

2) Background Art

It is well known to employ bituminous compositions as various surface coatings and in particular as road surface dressings, on condition that these compositions have a certain number of essential mechanical properties.

In practice, these mechanical properties are assessed by determining, using standardised tests, a series of mechanical characteristics, the most commonly employed of which are the following:

softening point, expressed in °C. and determined by the Ball-and-Ring test defined by NF Standard T 66 008, brittleness point or Fraass point, expressed in °C. and determined according to IP Standard 80/53, penetration, expressed in 1/10 mm and determined according to NF Standard T 66 004, tensile rheological characteristics determined according to NF Standard T 46 002 and comprising the values:
threshold stress σs in bars
threshold elongation εs in %
breaking stress σr in bars
elongation at break εr in %.

In general, the conventional bitumens do not simultaneously exhibit all the required properties and it as long been known that the addition of various polymers to these conventional bitumens makes it possible to modify favourably the mechanical properties of the latter and to form bitumen-polymer compositions which have mechanical properties that are improved when compared with those of bitumens by themselves.

The polymers liable to be added to bitumens are in most cases elastomers such as polyisoprene, butyl rubber, polybutene, polyisobutene, ethylene/vinyl acetate copolymers, polymethacrylate, polychloroprene, ethylene/propylene/diene (EPDM) terpolymer, polynorbornene or else random or block copolymers of styrene and of a conjugated diene.

Among the polymers added to the bitumens, random or block copolymers of styrene and of a conjugated diene and especially of styrene and butadiene or styrene and isoprene are particularly effective because they dissolve very easily in bitumens and impart excellent mechanical and dynamic properties to them, and especially very good viscoelasticity properties.

It is further known that the stability of bitumen-polymer compositions can be improved by chemical coupling of the polymer to the bitumen, this improvement additionally making it possible to broaden the field of application of the bitumen-polymer compositions.

Bitumen-polymer compositions in which a random or block copolymer of styrene and of a conjugated diene such as butadiene or isoprene is coupled to the bitumen can be prepared by making use of the processes described in references FR-A-2,376,188, FR-A-2,429,241, FR-A-2,528, 439 and EP-A-0,360,656. In these processes the said copolymer and a source of sulphur are incorporated into the bitumen, the operation being carried out between 130° C. and 230° C. and with stirring, and the mix thus formed is then kept stirred and at a temperature between 130° C. and 230° C. for at least fifteen minutes. The source of sulphur consists of chemically nonbonded sulphur (FR-A-2,376,188 and FR-A-2,429,241), a polysulphide (FR-A-2,528,439) or a sulphur-donor vulcanisation accelerator employed by itself or in combination with chemically nonbonded sulphur and/or a polysulphide or a vulcanisation accelerator which is not a sulphur-donor (EP-A-0,360,656) and the incorporation of the copolymer and of the source of sulphur into the bitumen is carried out either by direct addition of the said ingredients to the bitumen (FR-A-2,376,188, FR-A-2,528,439 and EP-A-0,360,656) or by first of all preparing a master solution of the copolymer and of the source of sulphur in a hydrocarbon oil and then adding the said master solution to the bitumen (FR-A-2,429,241, FR-A-2,528,439 and EP-A-0,360,656).

SUMMARY OF THE INVENTION

It has now been found that it is possible further to substantially improve, among others, the consistency (increase in the Ball-and-Ring softening point) and the elasticity, especially low-temperature elasticity, of the bitumen-polymer compositions in which a block copolymer of styrene and of conjugated diene, especially butadiene and isoprene, is coupled to the bitumen under the effect of a sulphur-donor coupling agent, if the said block copolymer is chosen from certain linear diblock A-B or triblock A-B-A copolymers, A denoting a polymer block consisting of a polystyrene block by itself or extended on the B side by a random copolymer of styrene and of the conjugated diene and B denoting a polymer block made up of conjugated diene units which have special molecular mass and composition characteristics, as defined below.

The subject of the invention is therefore a process for the preparation of bitumen-polymer compositions, in which a mixture of bitumen with a linear block copolymer of styrene and conjugated diene which has a weight-average molecular mass of between 120,000 and 400,000 and has a structure of A-B or A-B-A type is produced at a temperature of between 100° C. and 230° C., A denoting a polymer block consisting of a polystyrene block by itself or extended on the B side by a random copolymer of styrene and of the conjugated diene and B denoting a polymer block made up of conjugated diene units, the said block copolymer being employed in a quantity ranging from 0.5 to 25% by weight of bitumen, and with a coupling agent containing at least one sulphur-donor compound, and the mixture obtained is kept at a temperature of between 100° C. and 230° C. and with stirring, for a period of at least ten minutes, the said process being characterised in that the block copolymer of styrene and conjugated diene has a content of styrene in the form of polystyrene blocks in the polymer block(s) A of between 5.2% and 14.7% by weight of the copolymer and in that, when the block(s) A of the block copolymer A-B or A-B-A consist of a polystyrene block extended on the B side by a random copolymer of styrene and of the conjugated diene, the total weight content of styrene in the block copolymer is not more than 20%.

DESCRIPTION OF THE PREFERRED EMBODIMENTS

The bitumen, which forms the major part of the bitumen-copolymer compositions according to the invention, may be chosen from bitumens and bitumen mixtures which have a kinematic viscosity at 100° C. advantageously between $0.5 \times 10^{-4}$ m²/s and $3 \times 10^{-2}$ m²/s and preferably between $1 \times 10^{-4}$ m²/s and $2 \times 10^{-2}$ m²/s. Such bitumens may be bitumens from direct distillation or distillation at reduced pressure, oxidised or semioxidised bitumens, or even petroleum cuts or mixtures of bitumens and of vacuum distillates.

The bitumens and bitumen mixtures which have the abovementioned kinematic viscosity characteristics have a penetration, defined according to NF Standard T 66004, which is generally higher than 5 and, in many bitumens, between 5 and 500 and more especially between 20 and 400.

The linear block copolymer of styrene and conjugated diene employed in the preparation of the bitumen-polymer composition according to the invention is more especially such that the conjugated diene forming part of its composition with styrene is chosen from butadiene, isoprene, chloroprene, carboxylated butadiene and carboxylated isoprene and very particularly from butadiene and isoprene. The linear block copolymer of styrene and conjugated diene, and in particularly each of the particular copolymers in the case of which the conjugated diene is chosen as indicated above, advantageously has a weight-average molecular mass ($\overline{M}w$) ranging from 150,000 to 350,000 and more especially from 170,000 to 250,000.

The A-B or A-B-A block copolymer preferably has a weight content of conjugated diene of not more than 90%.

The linear block copolymer of styrene and conjugated diene which has the structure A-B (diblock) or A-B-A (triblock) and the weight-average molecular mass and composition characteristics defined above may be either a true block copolymer, that is to say in the case of which the polymer block A of the diblock copolymer A-B or each of the polymer blocks A of the triblock copolymer A-B-A consists solely of a polystyrene block, or a block copolymer with a statistical hinge ("tapered copolymer" or "graded copolymer"), that is to say in the case of which the block A of the diblock copolymer A-B or at least one of the A blocks of the triblock copolymer A-B-A consists of a polystyrene block extended on the B side by a statistical copolymer of styrene and of the conjugated diene, which statistical copolymer is referred to by the expression "statistical hinge".

The linear block copolymer of styrene and conjugated diene which can be employed for the preparation of the bitumen-polymer compositions according to the invention can be obtained by anionic solution polymerisation of the styrene and conjugated diene monomers as is well known in the art relating to the production of linear copolymers A-B (diblock) and A-B-A (triblock) of styrene and conjugated diene. Linear block copolymers of styrene and conjugated diene of A-B or A-B-A structure and of true block copolymer type can be advantageously produced by making use of a process comparable to that described, for example, in either of the citations FR-A-1,230,077 and EP-A-0,457,647. To produce linear block copolymers of styrene and conjugated diene of A-B or A-B-A structure and of block copolymer with a statistical hinge type, use may be made of a process comparable to that described, for example, in any of references FR-A-1,230,077, U.S. Pat. No. 3,287,333, U.S. Pat. No. 3,906,058, U.S. Pat No. 4,172,190 and EP-A-0,457,647.

The quantity of linear block copolymer of styrene and conjugated diene which is used in combination with the bitumen to form the bitumen-polymer composition in the presence of the sulphur-donor coupling agent advantageously represents 0.5% to 15% and more especially 0.7% to 10% of the weight of the bitumen.

The coupling agent containing at least one sulphur-donor compound is employed in a proportion capable of supplying a quantity of sulphur representing, by weight, 0.1 to 10% and preferably 0.4 to 8% of the weight of the linear block copolymer of styrene and conjugated diene.

The coupling agent containing at least one sulphur-donor compound may consist of a product chosen from the group made up of elemental sulphur, hydrocarbyl polysulphides, sulphur-donor vulcanisation accelerators, mixtures of such products with each other and/or with vulcanisation accelerators which are not sulphur-donors. In particular, the sulphur-donor coupling agent is chosen from (i) the products M which contain, by weight, from 0% to 100% of a component D consisting of one or a number of sulphur-donor vulcanisation accelerators and from 100% to 0% of a component E consisting of one or a number of vulcanising agents chosen from elemental sulphur and hydrocarbyl polysulphides and (ii) the products N which contain a component C consisting of one or a number of vulcanisation accelerators which are not sulphur-donors and a product M in a weight ratio of the component C to the product M ranging from 0.01 to 1 and preferably from 0.05 to 0.5.

The elemental sulphur which can be employed to form, partially or wholly, the coupling agent is advantageously flowers of sulphur and preferably sulphur crystallised in the orthorhombic form and known by the name of alpha sulphur.

The hydrocarbyl polysulphides which can be employed to form part or all of the coupling agent may be chosen from those defined in citation FR-A-2,528,439 and which correspond to the general formula

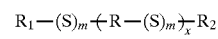

in which each of $R_1$ and $R_2$ denotes a $C_1$–$C_{20}$, saturated or unsaturated, monovalent hydrocarbon radical, or are joined together to form a saturated or unsaturated, $C_1$–$C_{20}$, divalent hydrocarbon radical forming a ring with the other groups of atoms associated in the formula, R is a $C_1$–$C_{20}$, saturated or unsaturated, divalent hydrocarbon radical, the —$(S)_m$— denote divalent groups each made up of m sulphur atoms, it being possible for the m to be different from one of the said groups to another and to denote integers ranging from 1 to 6 with at least one of the m equal to or greater to 2, and x denotes an integer assuming values from zero to 10. Preferred polysulphides correspond to the formula $R_3$—$(S)_p$—$R_3$, in which $R_3$ denotes a $C_6$–$C_{16}$ alkyl radical, for example hexyl, octyl, dodecyl, tert-dodecyl, hexadecyl, nonyl, decyl, and —$(S)_p$— denotes a divalent group formed by a chain sequence of p sulphur atoms, p being an integer ranging from 2 to 5.

When the coupling agent contains a sulphur-donor vulcanisation accelerator, the latter may be chosen, in particular, from thiuram polysulphides of formula

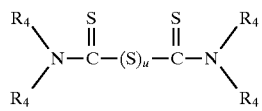

in which each of the $R_4$, which are identical or different, denotes a $C_1$–$C_{12}$, and preferably $C_1$–$C_8$ hydrocarbon radical, especially alkyl, cycloalkyl or aryl radical, or else two radicals $R_4$ bonded to the same single nitrogen atom are joined together to form a $C_2$–$C_8$ divalent hydrocarbon radical and u is a number ranging from 2 to 8. Examples of such vulcanisation accelerators which may be specially mentioned are the compounds dipentamethylenethiuram disulphide, dipentamethylenethiuram tetrasulphide, dipentamethylenethiuram hexasulphide, tetrabutylthiuram sulphide, tetraethylthiuram disulphide and tetramethylthiuram disulphide.

Other examples of sulphur-donor vulcanisation accelerators which may, be further mentioned are alkylphenol disulphides and disulphides such as morpholine disulphide and N,N'-caprolactam disulphide.

Vulcanisation accelerators which are not sulphur-donors and which can be employed to form the component C of the coupling agents of the product N type may be sulphur compounds chosen especially from mercaptobenzothiazole and its derivatives, especially metal benzothiazolethiolates and especially benzothiazolesulphenamides, dithiocarbamates of formula

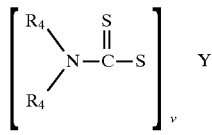

in which the $R_4$, which are identical or different, have the meaning given above, Y denotes a metal and v denotes the valency of Y, and thiuram monosulphides of formula

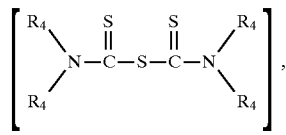

in which the $R_4$ have the meaning given above.

Examples of vulcanisation accelerators of the mercaptobenzothiazole type may be such as mercaptobenzothiazole, a benzothiazolethiolate of a metal such as zinc, sodium, copper, benzothiazyl disulphide, 2-benzothiazolepentamethylenesulphenamide, 2-benzothiazolthiosulphenamide, 2-benzothiazoledihydrocarbylsulphenamides in which the hydrocarbyl radical is an ethyl, isopropyl, tert-butyl or cyclohexyl radical, and N-oxydiethylene-2-benzothiazolesulphenamide.

Among the vulcanisation accelerators of the type of the dithiocarbamates of abovementioned formula there may be mentioned dimethyldithiocarbamate compounds of metals such as copper, zinc, lead, bismuth and selenium, diethyldithiocarbamates of metals such as cadmium and zinc, diamyldithiocarbamates of metals such as cadmium, zinc and lead, and lead or zinc pentamethylenedithiocarbamate.

By way of examples of thiuram monosulphides which have the formula given above there may be mentioned compounds such as dipentamethylenethiuram monosulphide, tetramethylthiuram monosulphide, tetraethylthiuram monosulphide and tetrabutylthiuram monosulphide.

Other vulcanisation accelerators which are not sulphur-donors, which do not belong to the classes defined above, can also be employed. Such vulcanisation accelerators may be such as 1,3-diphenylguanidine, diortho-tolylguanidine and zinc oxide, it being possible for this latter compound to be employed optionally in the presence of fatty acids of the stearic acid, lauric acid or ethylcaproic acid type.

For further details on sulphur-donor accelerators and those which are not sulphur-donors and which can be employed in the constitution of the coupling agent, reference may be made to references EP-A-0,360,656 and EP-A-0,409,683.

Depending on its composition, as indicated above, the coupling agent may be of the single-component type or of the multicomponent type, it being possible for the coupling agent of the multicomponent type to be formed before its use, or else produced in situ in the medium in which is to be present. The coupling agent of the preformed multicomponent type or of the single-component type or the components of the coupling agent of the multicomponent type formed in situ may be used as they are, for example in the molten state, or else as a mixture, for example in solution or in suspension, with a diluent, for example, a hydrocarbon compound.

The reaction mixture made up of the bitumen, the linear block copolymer and the coupling agent, which gives rise to the bitumen-polymer composition, may have further added to it from 1 to 40% and more particularly from 2 to 30%, by weight of the bitumen, of a fluxing agent which may consist, in particular, of a hydrocarbon oil exhibiting a distillation range at atmospheric pressure, determined according to ASTM Standard D 86-67, of between 100° C. and 600° C. and situated more especially between 150° C. and 400° C. This hydrocarbon oil, which may be especially a petroleum cut of aromatic nature, a petroleum cut of naphthenoaromatic nature, a petroleum cut of naphthenoparaffinic nature, a petroleum cut of paraffinic nature, a coal oil or else an oil of vegetable origin, is sufficiently "heavy" to limit the evaporation at the time of its addition to the bitumen, and at the same time sufficiently "light" to be removed as much as possible after spreading of the bitumen-polymer composition containing it, so as to regain the same mechanical properties which would have been exhibited, after hot spreading, by the bitumen-polymer composition prepared without adding any fluxing agent. The fluxing agent may be added to the reaction mixture which is made up from the bitumen, the linear block copolymer and the coupling agent, at any time of the formation of the said mixture, the quantity of fluxing agent being chosen within the ranges defined above so as to be compatible with the desired final use on the work site.

To the reaction mixture made up of the bitumen, the linear block copolymer, the coupling agent and optionally the fluxing agent there may further be added, at any time of the formation of the said mixture, various additives and especially nitrogen compounds of the amine or amide type such as those defined in citation EP-A-0,409,683, as promoters of adhesion of the final bitumen-polymer composition to mineral surfaces, the said nitrogen compounds being incorporated into the said reaction mixture before the addition of the coupling agent to the latter so that these nitrogen compounds are grafted onto the block linear copolymer in the resulting bitumen-polymer composition.

In an embodiment of the process according to the invention employing a hydrocarbon oil as defined above, as fluxing agent, the copolymer and the coupling agent are incorporated into the bitumen in the form of a master solution of these products in the hydrocarbon oil forming the fluxing agent.

The master solution is prepared by bringing the ingredients of which it is composed into contact, namely hydrocarbon oil used as solvent, copolymer and coupling agent, with stirring, at temperatures of between 10° and 170° C. and more particularly between 40 and 120° C., for a sufficient time, for example from approximately 30 minutes to approximately 90 minutes, to obtain a complete dissolution of the copolymer and of the coupling agent in the hydrocarbon oil.

The respective concentrations of the copolymer and of the coupling agent in the master solution may vary fairly widely as a function, in particular, of the nature of the hydrocarbon oil employed for dissolving the copolymer and the coupling agent. Thus, the respective quantities of copolymer and of coupling agent may advantageously represent 5% to 40% and 0.02 to 15% of the weight of the hydrocarbon oil. A preferred master solution contains 10 to 35% of copolymer and 0.1 to 5% of coupling agent, these being calculated as the weight of the hydrocarbon oil employed as solvent.

When the compositions according to the invention are made up directly from the bitumen, copolymer and coupling agent ingredients, the operation is preferably carried out by first of all bringing the copolymer into contact with the bitumen, in the chosen proportions, at a temperature of between 100° C. and 230° C. and with stirring, for a sufficient period, generally of the order of a few tens of minutes to a few hours, to form a homogeneous mixture, and then the coupling agent is added to the mixture obtained and the whole is kept stirred at a temperature of between 100° C. and 230° C., for example corresponding to the temperature for bringing the copolymer into contact with the bitumen, for a period of at least 10 minutes and generally ranging from 10 to 90 minutes, to enable the coupling agent to release radical sulphur and for the radical sulphur thus produced to initiate, on the one hand, grafting of the copolymer to the bitumen and, on the other hand, the mutual bridging of the chains of the said copolymer.

The quantities of copolymer brought into contact with the bitumen and the coupling agent which are next added to the homogeneous mixture of bitumen and the said copolymer are chosen to be within the ranges defined above for these quantities.

When a fluxing agent is employed, it may be added to the reaction mixture made up of the bitumen, the linear block copolymer and the coupling agent at any time of the constitution of the said mixture.

To prepare the bitumen-polymer compositions according to the invention by making use of the master solution technique, the master solution of the copolymer and of the coupling agent is mixed with the bitumen, the operation being carried out at a temperature of between 100° C. and 230° C. and with stirring, this being done, for example, by adding the master solution to the bitumen kept stirred at the temperature between 100° C. and 230° C., and the resulting mixture is then kept stirred at a temperature between 100° C. and 230° C., for example at the temperature employed for mixing the master solution with the bitumen, for a period of at least 10 minutes and generally ranging from 10 to 90 minutes, to permit, by means of the coupling agent, grafting of the copolymer to the asphaltenes of the bitumen and the mutual bridging of the chains of the said copolymer.

The quantity of master solution mixed with the bitumen is chosen to supply the desired quantities of copolymer and of coupling agent, in relation to the bitumen, the said quantities being within the ranges defined above.

A particularly preferred form of embodiment for the preparation of bitumen-polymer compositions according to the invention by the master solution technique consists in bringing, at a temperature of between 100° C. and 230° and with stirring, from 80 to 95% by weight of the bitumen into contact with 20 to 5% by weight of the master solution, the latter containing 10 to 35% of copolymer of styrene and conjugated diene and 0.1 to 5% of coupling agent, by weight of the hydrocarbon oil used as solvent, and in then keeping the mixture thus obtained stirred at a temperature of between 100° C. and 230° C., and preferably at the temperature employed for bringing the bitumen into contact with the master solution, for a period of at least 10 minutes and preferably between 10 and 60 minutes.

The bitumen-polymer compositions according to the invention can be employed directly or after emulsifying with water, for the production of coatings and especially of road dressings of the surface dressing type, for the production of bituminous mixtures applied hot or cold, or else for the production of seal coatings.

The invention is illustrated by the following examples given without any limitation being implied.

The rheological and mechanical characteristics of the bitumens or of the bitumen-polymer compositions to which reference is made in these examples are those defined above, namely penetration, softening point, Fraass point and tensile rheological characteristics.

EXAMPLE 1

Preparation of a control bitumen-polymer composition by direct incorporation of a styrene/butadiene diblock copolymer and of a coupling agent into the bitumen With the operation being carried out at 170° C. with stirring, 1,000 parts by weight of a direct distillation bitumen which had a penetration of 82, a Ball-and-Ring softening point of 48° C., a Fraass point equal to −18.5° C. and a kinematic viscosity of $1.7 \times 10^{-4}$ m$^2$/s at 160° C. were mixed with 20 parts by weight of a commercial diblock copolymer of styrene and butadiene exhibiting a weight-average molecular mass of approximately 75,000 and containing 25% by weight of styrene.

After 3 hours 10 minutes of mixing with stirring, a homogeneous mass was obtained.

1 part by weight of crystalline sulphur was then added to this mass maintained at 170° C. and the whole was stirred again for 60 minutes to form the bitumen-polymer composition.

Table I gives the main characteristics of the bitumen-polymer composition thus obtained, before and after it was submitted to the aging test known as "Rolling Film Oven Test" defined in ASTM Standard D 2872. The bitumen-polymer compositions before and after the aging test are referred to as "Product Ia1" and "Product Ia2" respectively.

Table I also gives the corresponding characteristics of the original bitumen before and after the aging test ("Product Ib1" and "Product Ib2" respectively).

When reference is made to the values recorded in Table I it can be seen that the use of a coupling agent consisting of crystalline sulphur results in a bitumen-polymer composition whose elastomeric characteristics clearly distinguish it from the bitumen (compare the results of the tensile test). Moreover, the stability of the bitumen-polymer composition to aging is improved when compared with that observed with pure bitumen.

TABLE I

| | Characteristics | | | | | | | | |
|---|---|---|---|---|---|---|---|---|---|
| | Penetrability | BRT softening | | TENSILE TEST | | | | | |
| Product | at 25° C. (1/10 mm) | point (°C.) | Fraass point (°C.) | Temperature (°C.) | Speed mm/mn | σs (bars) | σr (bars) | εs (%) | εr (%) |
| Ia1 | 71 | 51 | −19.5 | 20 | 500 | 1.65 | 0.50 | 22.2 | >900 |
| | | | | 5 | 500 | 16.60 | 4.90 | 15.50 | 820 |
| Ia2 | 56 | 57 | −17 | 20 | 500 | 3.30 | 0.75 | 24.30 | >900 |
| | | | | 5 | 500 | 17.55 | 6.10 | 16.95 | 444 |
| Ib1 | 62 | 48 | −18.5 | 20 | 500 | 1.2 | 0 | 15 | >900 |
| | | | | 5 | 500 | BRITTLE | | | |
| Ib2 | 51 | 50 | −15 | 20 | 500 | 1.8 | 0 | 15 | >900 |
| | | | | 5 | 500 | BRITTLE | | | |

EXAMPLE 2

Preparation of a bitumen-polymer composition according to the invention by direct incorporation of a styrene/butadiene diblock copolymer and of a coupling agent into the bitumen The operation was carried out as described in Example 1, but employing, as copolymer, a styrene/butadiene diblock copolymer according to the invention which had the structure A-B and the characteristics given below:

$\overline{M}w$: 181,000

Weight content of butadiene: 86%

Weight content of polystyrene in the form of polystyrene block: 14%

This diblock copolymer block was obtained by making use of an anionic polymerisation technique, comparable to that taught by reference EP-A-0,457,647.

Preparation of the diblock copolymer 2000 g of dry ethylbenzene and 0.96 g of n-BuLi (n-butyllithium) were introduced, after purging with nitrogen and several washings with a solution of n-BuLi in ethylbenzene, into a 20-liter stainless steel reactor equipped with a temperature control and a stirrer of the twin band type coupled to a 0.55 kW motor.

400 g of styrene were then charged into the reactor in less than 10 minutes and, as a result of the reaction, this produced a rise in temperature to a value of approximately 45° C., which was then maintained for 1 hour to ensure complete consumption of the styrene. 2460 g of liquid butadiene were then added to the content of the reactor, this addition being carried out continuously over a time of less than 3 hours and so that at the end of 30 minutes the reaction mixture was at a temperature of 70° C., the said temperature being then maintained until the end of polymerisation. The pressure in the reactor was 4 bars.

When the viscosity of the mixture, measured at 70° C., reached appreciably 580 Pa s the reactor was placed for 30 minutes under a pressure of 4 bars of $CO_2$, after which 1.5 g of water were introduced into it and its content was kept at 90° C. for 30 minutes.

0.3% by weight of Irganox 1520® antioxidant and 0.6% by weight of trinonyl phenylphosphite were then added to the content of the reactor at the temperature of 90° C., after which the copolymer was degassed in a single flash stage in a conventional device consisting of a mixed devolatilisation chamber. This operation was carried out at 150° C. at a pressure of 2000 Pa and made it possible to recover, by means of an extraction screw and a granulation equipment, copolymer granules which had a final residual solvent content of less than 1000 ppm.

The copolymer obtained had the characteristics defined above. The weight molecular mass was determined from GPC (gel permeation chromatography) curves, while the block styrene/total styrene ratio and the weight contents of styrene and butadiene were obtained by infrared spectroscopy.

Table II gives characteristics analogous to those which appear in Table I, for bitumen-polymer compositions obtained in Examples 1 and 2. The same notations symbolise the characteristics corresponding to the bitumen-polymer compositions before and after the aging test.

As emerges from the results given in Table II, the use of the styrene/butadiene linear diblock copolymer according to the invention results in a bitumen-polymer composition being obtained exhibiting substantially improved elastomeric characteristics, especially at low temperature, after aging, when compared with those observed in the case of the control bitumen-polymer composition.

TABLE II

| | Characteristics | | | | | | | | |
|---|---|---|---|---|---|---|---|---|---|
| | Penetrability | BRT softening | | TENSILE TEST | | | | | |
| Product | at 25° C. (1/10 mm) | point (°C.) | Fraass point (°C.) | Temperature (°C.) | Speed mm/mn | σs (bars) | σr (bars) | εs (%) | εr (%) |
| Ia1 | 71 | 51 | −19.5 | 20 | 500 | 1.65 | 0.50 | 22.2 | >900 |
| | | | | 5 | 500 | 16.60 | 4.90 | 15.50 | 820 |
| Ia2 | 50 | 57 | −17 | 20 | 500 | 3.30 | 0.75 | 24.30 | >900 |
| | | | | 5 | 500 | 17.55 | 5.10 | 16.95 | 444 |
| IIa1 | 73 | 53 | −20 | 20 | 500 | 1.70 | 0.60 | 21.62 | >900 |
| | | | | 5 | 500 | 14.42 | 5.11 | 24.1 | >900 |
| IIa2 | 52 | 57 | −18 | 20 | 500 | 2.73 | 1 | 23.40 | >900 |
| | | | | 5 | 500 | 18.90 | 6.05 | 23.40 | 700 |

EXAMPLES 3 TO 5

Preparation of bitumen-polymer compositions according to the invention by direct incorporation of the copolymer and of the coupling agent into the bitumen The operation was carried out as described in Example 2, but with some changes which are defined below, the other general conditions being those of Example 2.

In Example 3 the copolymer was a linear styrene/butadiene triblock copolymer according to the invention which had the structure A-B-A and the following characteristics:

$\overline{M}w$: 192,000

Weight content of styrene in the form of polystyrene block: 14.2%

Weight content of butadiene: 85.8%

This linear triblock copolymer was obtained by using an anionic polymerisation technique comparable to that taught by reference EP-A-0,457,647.

In Example 4 the copolymer was a linear styrene/butadiene diblock copolymer with a statistical hinge (tapered copolymer) according to the invention which had the structure A-B and the following characteristics:

$\overline{M}w$: 191,000

$\overline{M}n$: 172,000

Polydispersity ($\overline{M}w$: ($\overline{M}n$) 1.11

Total weight content of styrene: 12%

Weight content of butadiene: 88%

Weight content of styrene in the form of polystyrene block: 5.5%

This linear diblock copolymer with a statistical hinge was prepared by using an anionic polymerisation technique comparable to that taught by reference FR-A-1,230,077.

In Example 5 the copolymer was a linear styrene/butadiene diblock copolymer with a statistical hinge (tapered copolymer) according to the invention, which had the structure A-B and the following characteristics:

$\overline{M}w$: 200,000

Total weight content of styrene: 17%

Weight content of butadiene: 83%

Weight content of styrene in the form of polystyrene block: 10.7%

This linear diblock copolymer with a statistical hinge was prepared by using an anionic polymerisation technique comparable with that taught by reference FR-A-1,230,077.

Preparation of the triblock copolymer of Example 3

The operation was carried out as described in Example 2 until the end of the introduction of butadiene into the reactor. The reactor pressure was 4 bars. 2.80 g of n-BuLi were employed.

When the viscosity of the mixture, measured at 70° C., reached appreciably 580 Pa s, a quantity of 2.6 g of ethyl acetate was added to the content of the reactor, maintained at 70° C., and the whole was then kept at the said temperature for 30 minutes to allow the ethyl acetate to act as an agent for coupling diblock copolymer chains into triblock copolymer chains, the viscosity of the coupled product reaching appreciably 600 Pa s at the temperature of 70° C. at the end of the said period. The reactor was then placed under a pressure of 4 bars of $CO_2$ for 30 minutes, after which 3 g of water were introduced into it and its content was kept at 90° C. for 30 minutes.

The content of the reactor was then treated as indicated in Example 2, finally resulting in the formation of a triblock copolymer which had the characteristics defined above and a final residual solvent content of less than 1000 ppm. The said characteristics being determined as indicated in Example 2.

Preparation of the diblock copolymer with a statistical hinge of Example 4

7000 g of dry cyclohexane and 0.90 g of n-BuLi (n-butyllithium) were introduced into a stainless steel stirred vertical reactor previously purged with nitrogen and washed a number of times with a solution of n-BuLi in cyclohexane.

162 g of styrene were then charged into the reactor in less than 10 minutes and this styrene charge was polymerised at a temperature below 60° C. After styrene polymerisation, 198 g of styrene and 200 g of butadiene were introduced together into the reactor, this combined introduction of the styrene and butadiene monomers being carried out continuously while the polymerisation mixture was kept at a temperature of 70° C. After the monomers were completely consumed, 2440 g of butadiene were introduced into the reactor and polymerised at 70° C. in less than 3 hours.

At the end of the butadiene polymerisation the polymerisation was finished by adding to the content of the reactor a solution containing 5% of isopropanol in toluene, also containing 0.3% by weight of Irganox 1520® antioxidant and 0.6% by weight of trinonyl phosphite, after which the copolymer produced was isolated from its solution in cyclohexane by precipitation with the aid of isopropanol.

The diblock copolymer obtained with a statistical hinge had the characteristics defined above, the said characteristics being determined as indicated in Example 2.

Preparation of the diblock copolymer with a statistical hinge of Example 5

The operation was carried out as described for the preparation of the diblock copolymer with a statistical hinge of Example 4, but with polymerisation of 320 g of styrene in the first stage, copolymerisation of 190 g of styrene and 200 g of butadiene in the second stage and polymerisation of 2290 g of butadiene in the third stage.

The diblock copolymer obtained with a statistical hinge had the characteristics defined above, the said characteristics being determined as indicated in Example 2.

Table III gives the characteristics of the bitumen-polymer compositions obtained, before and after the aging test, for Example 3 (products IIIa1 and IIIa2), Example 4 (products IVa1 and IVa2) and Example 5 (products Va1 and Va2).

Use of the copolymers according to the invention also results in bitumen-polymer compositions whose Ball-and-Ring softening point is increased, which allows these compositions to be used over a wider temperature range.

TABLE III

| | Characteristics | | | | | | | | |
|---|---|---|---|---|---|---|---|---|---|
| | Penetrability | BRT softening | | TENSILE TEST | | | | | |
| Product | at 25° C. (1/10 mm) | point (°C.) | Fraass point (°C.) | Temperature (°C.) | Speed mm/mn | $\sigma s$ (bars) | $\sigma r$ (bars) | $\epsilon s$ (%) | $\epsilon r$ (%) |
| IIIa1 | 74 | 54 | −23 | 20 | 500 | 1.8 | 0.71 | 24 | >900 |
| | | | | 5 | 500 | 15.1 | 6.3 | 16.2 | >900 |
| IIIa2 | 56 | 59 | −21 | 20 | 500 | 2.8 | 1.3 | 27.2 | >900 |
| | | | | 5 | 500 | 18 | 7.3 | 17.9 | >900 |
| IVa1 | 79 | 58 | −18 | 20 | 500 | 1.9 | 0.83 | 22.9 | >900 |
| | | | | 5 | 500 | 14.5 | 6.7 | 17.6 | >900 |
| Va1 | 71 | 55 | −20 | 20 | 500 | 1.45 | 0.70 | 23.4 | >900 |
| | | | | 5 | 500 | 14.1 | 6.2 | 18.6 | >900 |
| Va2 | 51 | 58 | −19 | 20 | 500 | 2.55 | 1.21 | 25.8 | >900 |
| | | | | 5 | 500 | 19 | 7.0 | 15.7 | >900 |

EXAMPLES 6–7

Preparation of bitumen-polymer compositions according to the invention by direct incorporation of the copolymer and of the coupling agent into the bitumen In Example 6 the operation was carried out as described in Example 2, but using 25 parts by weight of the styrene/butadiene diblock copolymer instead of 20 parts by weight.

In Example 7 the operation was carried out as described in Example 2, but using 25 parts by weight of the styrene/butadiene diblock copolymer instead of 20 parts by weight and by forming the coupling agent from a mixture of 0.1 part by weight of crystalline sulphur and 0.02 part by weight of a sulphur-donor vulcanisation accelerator consisting of tetramethylthiuram disulphide.

Table IV gives the characteristics of the bitumen-polymer compositions thus obtained, before and after they were subjected to the aging test, for Example 6 (products VIa1 and VIa2) and Example 7 (products VIIa1 and VIIa2).

TABLE IV

| | Characteristics | | | | | | | | |
|---|---|---|---|---|---|---|---|---|---|
| | Penetrability | BRT softening | | TENSILE TEST | | | | | |
| Product | at 25° C. (1/10 mm) | point (°C.) | Fraass point (°C.) | Temperature (°C.) | Speed mm/mn | $\sigma s$ (bars) | $\sigma r$ (bars) | $\epsilon s$ (%) | $\epsilon r$ (%) |
| VIa1 | 65 | 54 | −19.5 | 20 | 500 | 1.8 | 0.6 | 24.6 | >900 |
| | | | | 5 | 500 | 13.7 | 5.4 | 23.4 | >900 |
| VIa2 | 46.8 | 56.2 | −18 | 20 | 500 | 2.8 | 1.2 | 27.7 | >900 |
| | | | | 5 | 500 | 18 | 7.1 | 23.4 | 730 |
| VIIa1 | 84 | 55 | −20 | 20 | 500 | 1.5 | 0.7 | 24 | >900 |
| | | | | 5 | 500 | 13.6 | 5.1 | 24 | >900 |
| VIIa2 | 48.7 | 58.2 | −19 | 20 | 500 | 2.7 | 1.2 | 28.5 | >900 |
| | | | | 5 | 500 | 18.6 | 8 | 20.3 | >900 |

EXAMPLE 8

Preparation of a control bitumen-polymer composition by the master solution technique a—Preparation of the master solution The operation was carried out in a stainless steel reactor fitted with a stirrer and a jacket through which a heat-transfer fluid could be passed.

The hydrocarbon oil employed as the solvent for making up the master solution was a petroleum cut of naphthenoaromatic nature, which had the following characteristics:

ASTM initial distillation point of 176° C.

ASTM final distillation point of 352° C. (these being measured according to ASTM Standard D 86-67)

flash point (Luchaire NF Standard T 60103) of 79° C.

density (ASTM Standard D 1657-64) of 0.956.

233 parts by weight of the petroleum cut were introduced into the reactor and this petroleum cut was heated, while being stirred, to a temperature of approximately 100° C. by circulating a hot fluid through the reactor jacket.

While this temperature and the stirring were maintained, 2 parts by weight of crystalline sulphur were then introduced into the reactor, as were 54 parts by weight of a powder, treated against lumping with 2% by weight of silica, of a commercial diblock copolymer of styrene and butadiene, containing 25% by weight of styrene and with a viscometric average molecular mass of approximately 75,000.

After one hour's stirring at the temperature of approximately 100° C. a homogeneous solution was obtained, fluid at normal temperature, characterised by the following kinematic viscosity values:

kinematic viscosity measured at 50° C.: $12.10 \times 10^{-4}$ m²/s kinematic viscosity measured at 100° C.: $2.92 \times 10^{-4}$ m²/s This solution formed the master solution employed for the preparation of the bitumen-polymer composition.

b—Preparation of the bitumen-polymer composition 1,700 parts of a direct distillation bitumen exhibiting the following initial physical properties were pumped at 170° C. into a vessel fitted with stirrers and provided with steam heaters:

softening point (B & R test): 48° C.

Fraass point: −18.5° C.

penetration: 82 1/10 mm kinematic viscosity at 160° C.: $1.70 \times 10^{-4}$ m²/s 300 parts of the master solution prepared as described above were then added to the content of the vessel, kept stirred at 170° C.

After 30 minutes' stirring at the temperature of 170° C. a fluid bitumen-polymer composition was obtained exhibiting a dynamic viscosity of 0.098 Pa s at 160° C., that is to say a viscosity comparable with that of a bitumen which has a penetration in the 180–220 range, and capable of being charged directly into a conventional medium-pressure spreader.

EXAMPLE 9
Preparation of a bitumen-polymer composition according to the invention by the master solution technique The operation was carried out as in Example 8, but by making up the master solution with 233 parts by weight of the petroleum cut, 42.7 parts by weight of the styrene/butadiene diblock copolymer according to the invention employed in Example 2 and 1.7 parts by weight of crystalline sulphur.

The control bitumen-polymer composition of Example 8 and the bitumen-polymer composition according to the invention of Example 9 were subjected to a heat treatment consisting in heating to 50° C., in an oven, an open metal receptacle containing a sample of the bitumen-polymer composition in question and in keeping the said receptacle at this temperature for 15 days, this test making it possible to simulate the evaporation of the light products from the petroleum cut and to evaluate the product after stabilisation.

Table V gives the characteristics of the bitumen-polymer compositions obtained, before and after heat treatment, for the control Example 8 (products VIIIa1 and VIIIa2) and for Example 9 according to the invention (products IXa1 and IXa2).

As emerges from the results shown in Table V, the use of the copolymer according to the invention results in the formation of bitumen-polymer compositions which exhibit elastomeric characteristics which are clearly improved, in particular at low temperature.

control bitumen-polymer compositions X.1a, X.1b, X.1c and X.1d respectively, and, on the other hand, compositions according to the invention X.2a, X.2b, X.2c and X.2d respectively.

TABLE VI

| Bitumen | Penetration at 25° C. (1/10 mm) | Softening point Ball & Ring (°C.) | Viscosity at 60° C.) (Pa s) |
|---|---|---|---|
| a | 62 | 47.9 | 196 |
| b | 72 | 48 | 199.5 |
| c | 82 | 46.4 | 178.5 |
| d | 97 | 44.2 | 61.6 |

Preparation of control bitumen-polymer compositions

The operation was carried out as indicated in Example 1, by mixing 938 parts by weight of the chosen bitumen with 60 parts by weight of the commercial diblock copolymer of styrene and butadiene, employed in Example 1.

After 5 hours' mixing with stirring, a perfectly homogeneous mass was obtained.

2 parts by weight of crystalline sulphur were then added to this mass kept at 170° C. and the whole was stirred further for 90 minutes to form a bitumen-polymer composition.

This bitumen-polymer composition was then diluted at 170° C. either with 1000 parts by weight of the original bitumen to obtain a bitumen-polymer composition containing 3% by weight of diblock copolymer, or with 2000 parts by weight of the original bitumen, to obtain a bitumen-polymer composition containing 2% by weight of diblock copolymer.

Preparation of the bitumen-polymer compositions according to the invention

The operation was carried out as for the preparation of the control bitumen-polymer compositions, but with a copolymer according to the invention being employed, consisting of the diblock copolymer of styrene and butadiene employed in Example 2.

The ductility of these various compositions was measured using test pieces made up with the aid of each of the bitumen-polymer compositions obtained, namely control bitumen-polymer compositions and bitumen-polymer compositions according to the invention, this measurement being carried out at 4° C. according to NF Standard T 66-006.

TABLE V

| | Characteristics | | | | | TENSILE TEST | | | | | |
|---|---|---|---|---|---|---|---|---|---|---|---|
| Product | Polymer (weight %) | Pseudo-viscosity at 50° C.*) (s) | Penetra-bility at 25° C. (1/10 mm) | BRT softening point (°C.) | Ductility at 5° C. (cm) | Temperature (°C.) | Speed mm/mn | σs (bars) | σr (bars) | εs (%) | εr (%) |
| VIII a1 | 3 | 115 | — | — | — | 10 | 500 | 6.8 | 2.00 | — | >900 |
| VIII a2 | 3 | — | 137 | 48 | 30 | 5 | 500 | 6.13 | 3.38 | — | >900 |
| | | | | | | −10 | 100 | | BRITTLE | | |
| IX a1 | 2.5 | 115 | — | — | — | 10 | 500 | 7.5 | 2.35 | — | >900 |
| IX e2 | 2.5 | — | 146 | 49 | 65 | 5 | 500 | 5.2 | 4.30 | — | >900 |
| | | | | | | −10 | 100 | 8.2 | 3.5 | — | 100 |

*)Determined according to NF Stenderd T 66 005

EXAMPLE 10
Preparation of bitumen-polymer compositions, control or according to the invention, by direct incorporation of the copolymer and of the coupling agent into the bitumen Four direct distillation bitumens, referred to as a, b, c and d respectively and exhibiting the characteristics which appear in Table VI, were used to prepare, on the one hand, The ductility is measured as the elongation, at the precise moment of its failure, of a test piece of specified shape which is drawn at a standardised speed and temperature.

The ductility values measured for the bitumen-polymer compositions and for the original bitumens are given in Table VII.

TABLE VII

| Bitumen | Polymer content (weight %) | Ductility at 4° C. (mm) |
|---|---|---|
| a | 0 | <15 |
| b | 0 | <15 |
| c | 0 | <10 |
| d | 0 | <10 |
| Bitumen-polymer composition | Polymer content (weight %) | Ductility (mm) |
| X.1a | 2 | 100 |
|  | 3 | 150 |
| X.1b | 2 | 170 |
|  | 3 | 210 |
| X.1c | 2 | 250 |
|  | 3 | 310 |
| X.1d | 2 | 120 |
|  | 3 | 180 |
| X.2a | 2 | 240 |
|  | 3 | 240 |
| X.2b | 2 | 230 |
|  | 3 | 280 |
| X.2c | 2 | 240 |
|  | 3 | 510 |
| X.2d | 2 | 270 |
|  | 3 | 300 |

As emerges from the results which appear in Table VII, use of the linear diblock copolymer of styrene and butadiene according to the invention results in the formation of bitumen-polymer compositions exhibiting a structural homogeneity and elastomeric characteristics which are clearly improved when compared with the control compositions, as shown by the values measured in the ductility test at 4° C.

We claim:

1. A process for the preparation of a bitumen-polymer composition which comprises
   a) producing at a temperature of between 100° C. and 230° C., a mixture of
      (i) a bitumen;
      ii) a linear block copolymer of styrene and a conjugated diene selected from the group consisting of butadiene, isoprene, chloroprene, carboxylated butadiene and carboxylated isoprene, said block copolymer being used in a quantity of from 0.5% to 25% by weight of bitumen and having a weight-average molecular weight of between 170,000 and 250,000 and a structure of A-B-A with A denoting a polymer block consisting of a polystyrene block by itself or extended on the B side by a random copolymer of styrene and of the conjugated diene and B denoting a polymer block consisting of conjugated diene units, the block copolymer having a styrene content in the form of a polystyrene block in the polymer block or blocks A which comprise between 5.2% and 14.7% by weight of the copolymer and, when the block or blocks A of the block copolymer A-B-A consists of a polystyrene block extended on the B side by a random copolymer of styrene and the conjugated diene, an overall weight content of styrene of not more than 20% by weight of the block copolymer; and
      (iii) a coupling agent containing at least one sulphur-donor compound and used in an amount to provide a quantity of sulphur representing, by weight, 0.1% to 10% of the weight of the linear block copolymer of styrene and conjugated diene; and
   (b) keeping the mixture thus produced at a temperature of between 100° C. and 230° C. and with stirring for a period of at least ten minutes.

2. A process according to claim 1, wherein the conjugated diene component of the block copolymer consists of butadiene or isoprene.

3. Process according to claim 1, wherein the block copolymer of styrene and conjugated diene has a weight content of conjugated diene of not more than 90%.

4. Process according to claim 1, wherein the quantity of block copolymer of styrene and conjugated diene which is added to the bitumen represents 0.5% to 15% by weight of the said bitumen.

5. Process according to claim 1, wherein the coupling agent is a product selected from the group consisting of elemental sulphur, hydrocarbyl polysulphides, sulphur-donor vulcanisation accelerators, mixtures of such products with each other and with vulcanisation accelerators which are not sulphur-donors.

6. Process according to claim 5, wherein the coupling agent is selected from (i) the products M which contain, by weight, from 0% to 100% of a component D consisting of one or a number of sulphur-donor vulcanisation accelerators and from 100% to 0% of a component E consisting of one or a number of vulcanisation agents selected from the group consisting of elemental sulphur and hydrocarbyl polysulphides and (ii) the products N which contain a component C consisting of one or a number of vulcanisation accelerators which are not sulphur-donors and a product M in a weight ratio of the component C to the product M ranging from 0.01 to 1.

7. Process according to claim 1, wherein the coupling agent is employed in a proportion capable of supplying a quantity of sulphur representing, by weight, 0.1 to 10% of the weight of the linear block copolymer of styrene and conjugated diene.

8. Process according to claim 1, wherein the bitumen is selected from the group consisting of bitumens and bitumen mixtures which have a kinematic viscosity at 100° C. of between $0.5 \times 10^{-4}$ m²/s and $3 \times 10^{-2}$ m²/s.

9. Process according to claim 8, wherein the bitumen has a penetration higher than 5.

10. Process according to claim 1, wherein the mixture made up of the bitumen, the linear block copolymer of styrene and conjugated diene and the coupling agent has added to it, at any time of its formation, from 1 to 40%, by weight of the bitumen, of a fluxing agent.

11. Process according to claim 10, wherein the said fluxing agent consists of a hydrocarbon oil exhibiting a distillation range at atmospheric pressure, determined according to ASTM Standard D 86-67, of between 100° C. and 600° C.

12. Process according to claim 11, wherein the hydrocarbon oil is selected from the group consisting of petroleum cuts of aromatic nature, petroleum cuts of naphthenoaromatic nature, petroleum cuts of naphthenoparaffinic nature, petroleum cuts of paraffinic nature, coal oils and oils of vegetable origin.

13. Process according to claim 11, wherein the block copolymer and the coupling agent are incorporated into the bitumen in the form of a master solution of these products in the hydrocarbon oil.

14. Process according to claim 13, wherein the master solution is prepared by bringing the ingredients of which it is composed into contact, with stirring, at temperatures of between 10° C. and 170° C.

15. Process according to claim 13, wherein the master solution contains 5% to 40%, of copolymer and 0.02% to 15%, of coupling agent, both calculated as weight of the hydrocarbon oil.

16. Process according to claim 13, wherein from 80 to 95% by weight of bitumen are brought into contact, at a temperature of between 100° C. and 230° C. and with stirring, with 20 to 5% by weight of the master solution, the latter containing, as weight of the hydrocarbon oil used as solvent, 10 to 35% of block copolymer and 0.1 to 5% of coupling agent, and the mixture thus obtained is then kept stirred at a temperature of between 100° C. and 230° C., for bringing the bitumen into contact with the master solution, for a period of at least 10 minutes.

17. The process of claim 4 wherein the quantity of block copolymer of styrene and conjugated diene is 0.7% to 10% by weight of said bitumen.

18. The process of claim 6 wherein the weight ratio of the component C to the product M ranges from 0.05 to 0.5.

19. The process of claim 7 wherein the quantity of sulphur is 0.4 to 8% of the weight of the linear block copolymer of styrene and conjugated diene.

20. The process of claim 8 wherein the kinematic viscosity at 100° C. is between $1 \times 10^{-4} m^2/s$ and $2 \times 10^{-2} m^2/s$.

21. The process of claim 9 wherein the bitumen has a penetration between 5 and 500.

22. The process of claim 9 wherein the bitumen has a penetration between 20 and 400.

23. The process of claim 10 wherein the fluxing agent is added in an amount of from 2 to 30% by weight of the bitumen.

24. The process of claim 11 wherein the distillation range is between 150° C. and 400° C.

25. The process of claim 14 wherein the temperature is between 40° C. and 120° C.

26. The process of claim 15 wherein the master solution contains 10% to 35% of copolymer and 0.1% to 5% of coupling agent.

27. The process of claim 16 wherein the mixture is kept stirred for a period of between 10 and 60 minutes.

28. A process for the preparation of a bitumen-polymer composition which comprises
  (a) producing at a temperature of between 100° C. and 230° C. a mixture of
    (i) a bitumen
    (ii) a linear block copolymer of styrene and a conjugated diene selected from the group consisting of butadiene, isoprene, chloroprene, carboxylated butadiene and carboxylated isoprene, said block copolymer being used in a quantity of from 0.5% to 25% by weight of bitumen and having a weight-average molecular weight of between 170,000 and 250,000 and a structure of A-B-A with A denoting a polymer block consisting of a polystyrene block extended on the B side by a random copolymer of styrene and of the conjugated diene and B denoting a polymer block consisting of conjugated diene units, the block copolymer having an overall weight content of styrene not exceeding 20% and a styrene content in the form of a polystyrene block in the polymer block or blocks and wherein A comprises between 5.2% and 14.7% by weight of the copolymer; and
    (iii) a coupling agent containing at least one sulphur-donor compound and used in an amount to provide a quantity of sulphur representing, by weight, 0.1% to 10% of the weight of the linear block copolymer of styrene and conjugated diene; and
  (b) maintaining the mixture thus produced at a temperature of between 100° C. and 230° C. with stirring for a period of at least ten minutes.

29. A process for the preparation of a bitumen-polymer composition which comprises
  (a) producing at a temperature of between 100° C and 230° C. a mixture of
    (i) a bitumen
    (ii) a linear block copolymer of styrene and a conjugated diene selected from the group consisting of butadiene, isoprene, chloroprene, carboxylated butadiene and carboxylated isoprene, said block copolymer being used in a quantity of from 0.5% to 25% by weight of bitumen and having a weight-average molecular weight of between 150,000 and 350,000 and a structure of A-B-A with A denoting a polymer block consisting of a polystyrene block and B denoting a polymer block consisting of conjugated diene units, the block copolymer having a styrene content which comprises between 5.2% and 14.7% by weight of the copolymer; and
    (iii) a coupling agent containing at least one sulphur-donor compound and used in an amount to provide a quantity of sulphur representing, by weight, 0.1% to 10% of the weight of the linear block copolymer of styrene and conjugated diene; and
  (b) keeping the mixture thus produced at a temperature of between 100° C. and 230° C. and with stirring for a period of at least ten minutes.

30. A process for the preparation of a bitumen-polymer composition which comprises
  (a) producing at a temperature of between 110° C. and 230° C. a mixture of
    (i) a bitumen
    (ii) a linear block copolymer of styrene and a conjugated diene selected from the group consisting of butadiene, isoprene, chloroprene, carboxylated butadiene and carboxylated isoprene, said block copolymer being used in a quantity of from 0.5% to 25% by weight of bitumen and having a weight-average molecular weight of between 150,000 and 350,000 and a structure of A-B-A with A denoting a polymer block consisting of a polystyrene block extended on the B side by a random copolymer of styrene and of the conjugated diene and B denoting a polymer block having an overall weight content of styrene not exceeding 20% and a styrene content in the form of a polystyrene block in the polymer block A comprised between 5.2% and 14.7% by weight of the copolymer; and
    (iii) a coupling agent containing at least one sulphur-donor compound and used in an amount to provide a quantity of sulphur representing, by weight, 0.1% to 10% of the weight of the linear block copolymer of styrene and conjugated diene; and
  (b) maintaining the mixture thus produced at a temperature of between 100° C. and 230° C. with stirring for a period of at least ten minutes.

31. A process for the preparation of a bitumen-polymer composition which comprises
  (a) producing at a temperature of between 100° C. and 230° C., a mixture of
    (i) a bitumen;
    (ii) a linear block copolymer of styrene and a conjugated diene selected from the group consisting of butadiene, isoprene, chloroprene, carboxylated butadiene and carboxylated isoprene, said block copolymer being used in a quantity of from 0.5% to 25% by weight of bitumen and having a weight-average molecular weight of between 150,000 and 350,000 and a structure of A-B-A with A denoting a polymer block consisting of a polystyrene block extended on the B side by a random copolymer of styrene and of the conjugated diene and B denoting a polymer block consisting of conjugated diene units, the block copolymer having an overall weight content of styrene not exceeding 20% and a styrene content in the form of a polystyrene block in the polymer block A comprised between 5.2% and 14.7% by weight of the copolymer; and (iii) a coupling agent containing at least one sulphur-donor compound and used in an amount to provide a quantity of sulphur representing, by weight, 0.1% to 10% of the weight of the linear block copolymer of styrene and conjugated diene; and (b) maintaining the mixture thus produced at a temperature of between 100° C. and 230° C., with stirring, for a period of at least ten minutes.

* * * * *